Feb. 4, 1930.    J. P. WALKER    1,745,731
LIQUID OUTLET FOR TANKS
Filed March 19, 1928
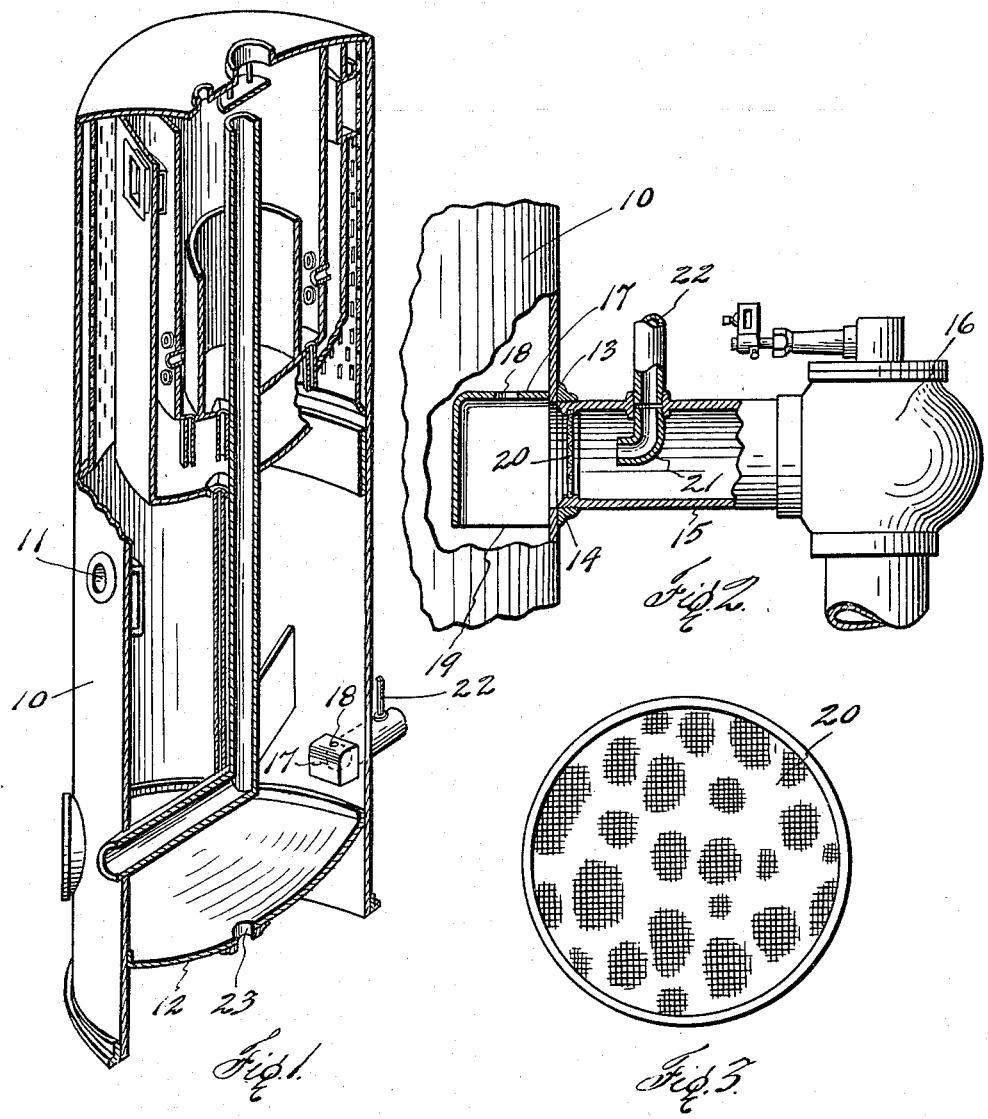

Patented Feb. 4, 1930

1,745,731

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

LIQUID OUTLET FOR TANKS

Application filed March 19, 1928. Serial No. 262,957.

This invention relates to new and useful improvements in liquid outlets for tanks.

In separator and other tanks the liquid or oil outlet is usually connected with a valve automatically opened when the oil in the tank falls below a predetermined level. There is always considerable foreign matter in crude oil and this gives considerable trouble by accumulating on the valve seat and causing a leak.

One object of the invention is to provide a screen in the outlet tube through which the oil or liquid is strained and whereby B. S. and other sediment is prevented from entering the tube and reaching the valve.

Another object of the invention is to provide a pressure nozzle within the tube for supplying a fluid under pressure to clean said screen, the parts being so arranged as to dislodge the accumulations into the tank.

A still further object of the invention is to provide a shield over the entrance to the tube and within the tank which acts to deflect trash from the entrance to said tube.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a typical oil and gas separator tank equipped with an outlet constructed in accordance with the invention, Fig. 2 is a view partly in elevation and partly in section showing an outlet constructed in accordance with the invention, and Fig. 3 is an elevation of the screen or strainer.

In the drawings the numeral 10 designates an upright tank having an oil and gas inlet 11 at mid-height and a bottom 12 at its lower end. Just above the bottom I provide an oil outlet opening 13 in the side wall of the tank. On the outside of said wall a collar 14 surrounding said opening is suitably fastened, as by welding.

A horizontal outlet tube 15 has its inner end secured in said collar while its outer end is connected to the usual automatic oil valve 16. Within the tank I provide a box or shield 17 welded or otherwise secured to the tank wall around the opening 13. This box has a vent opening 18 in its top and has its bottom 19 opened, as is shown in Fig. 2.

Trash and foreign matter flowing downward in the tank will be deflected from the opening 13 by reason of the box 17. This will tend to keep such matter away from the outlet. As a means of protecting the valve 16 I mount a relatively fine mesh screen 20 transversely of the tube adjacent the opening 13. This screen will act to strain the oil and prevent sediment and B. S. from flowing through the tube to the valve.

It is obvious that the screen would sooner or later become clogged by accumulations and for cleaning off the same I provide a nozzle 21 supported in the tube and directed toward the screen. This nozzle is connected with a pipe 22 and steam or other suitable fluid is thus conducted to the nozzle.

Whenever it is desired to clean off the screen, the fluid is supplied and sprayed against the screen, whereby accumulations are dislodged into the box 17 and fall back into the tank. The screen may be cleaned as often as necessary and only comparatively clean oil will be permitted to pass to the valve 16. This not only assures a proper working of the valve but tends to free the oil from objectionable matter. The accumulations may be drawn off from time to time through an opening 23 in the bottom 12 of the tank.

While I have described and shown the outlet in connection with an oil and gas separator, it is to be understood that the device may be used in connection with any tank or container wherein it would be found practical and useful.

Various changes in the size and shape of the different parts, as well as modifications and alterations, may be made within the scope of the appended claim.

What I claim, is:

A liquid outlet for tanks comprising a tubular conductor disposed at the lower portion thereof, a screen transversely of said conductor at the inlet thereto from the tank, a nozzle located in the conductor and having its discharge directed toward the side of the screen outside the tank, and a shield within the tank opposite the inner face of the screen and opening downwardly within the tank to discharge material released from the screen at the base of the tank.

In testimony whereof I affix my signature.

JAY P. WALKER.